US008634285B1

United States Patent
Oberg et al.

(10) Patent No.: US 8,634,285 B1
(45) Date of Patent: *Jan. 21, 2014

(54) TIMING LOOP WITH LARGE PULL-IN RANGE

(75) Inventors: Mats Oberg, Cupertino, CA (US); Jin Xie, Longmont, CO (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/603,795

(22) Filed: Sep. 5, 2012

Related U.S. Application Data

(63) Continuation of application No. 12/625,844, filed on Nov. 25, 2009, now Pat. No. 8,264,933, which is a continuation-in-part of application No. 12/359,855, filed on Jan. 26, 2009, now Pat. No. 8,358,566, which is a continuation-in-part of application No. 11/775,119, filed on Jul. 9, 2007.

(60) Provisional application No. 61/138,815, filed on Dec. 18, 2008, provisional application No. 60/830,630, filed on Jul. 13, 2006.

(51) Int. Cl.
*G11B 7/00* (2006.01)

(52) U.S. Cl.
USPC .............. 369/44.33; 369/44.32; 369/47.19; 369/47.44; 369/59.26

(58) Field of Classification Search
USPC .......... 369/59.26, 47.19, 44.32, 44.33, 47.44; 360/51; 375/368, 355
See application file for complete search history.

(56) References Cited

U.S. PATENT DOCUMENTS

| | | | |
|---|---|---|---|
| 5,533,003 A | 7/1996 | Kobayashi | |
| 5,559,777 A | 9/1996 | Maeda et al. | |
| 5,677,935 A * | 10/1997 | Karino | 375/368 |
| 5,699,106 A | 12/1997 | Matsubara et al. | |
| 5,726,966 A | 3/1998 | Sugaya | |
| 5,729,396 A | 3/1998 | Dudley et al. | |
| 5,793,548 A * | 8/1998 | Zook | 360/51 |
| 5,907,446 A | 5/1999 | Ishii et al. | |
| 6,263,469 B1 | 7/2001 | Jang | |
| 6,369,969 B1 | 4/2002 | Christiansen et al. | |
| 6,396,998 B1 | 5/2002 | Nozaki et al. | |
| 6,529,459 B1 | 3/2003 | Lebowsky | |
| 6,603,622 B1 | 8/2003 | Christiansen et al. | |
| 6,639,748 B1 | 10/2003 | Christiansen et al. | |
| 6,657,802 B1 | 12/2003 | Ashley et al. | |
| 6,674,695 B1 * | 1/2004 | Miyanabe et al. | 369/44.32 |
| 7,054,398 B1 | 5/2006 | Wu et al. | |
| 7,391,583 B1 | 6/2008 | Sheh et al. | |

(Continued)

OTHER PUBLICATIONS

Shogo Suzuki, et al., A Newly Developed Single-chip LSI for HD DVD/DVD/CD; IEEE Transactions on Consumer Electronic, vol. 52, No. 1, Feb. 2006.

(Continued)

*Primary Examiner* — Thuy Pardo

(57) ABSTRACT

Aspects of the disclosure provide a sync mark detector. The sync mark detector includes a first unit configured to decay over time a value indicating a length of a bit format, a second unit configured to compare the decayed value with a detected length of the bit format to determine a new length, and a third unit configured to detect a sync mark based on the detected length and the new length.

15 Claims, 16 Drawing Sheets

(56) References Cited

U.S. PATENT DOCUMENTS

| | | |
|---|---|---|
| 7,466,782 B1* | 12/2008 | Patapoutian ............... 375/355 |
| 7,926,084 B1 | 4/2011 | Harvey et al. |
| 2001/0053225 A1 | 12/2001 | Ohira et al. |
| 2002/0150179 A1 | 10/2002 | Leis et al. |
| 2003/0193614 A1 | 10/2003 | Holland et al. |
| 2003/0206722 A1 | 11/2003 | Tanaka et al. |
| 2003/0233197 A1 | 12/2003 | Padilla et al. |
| 2004/0017996 A1 | 1/2004 | Yamaguchi |
| 2004/0163116 A1 | 8/2004 | Taira et al. |
| 2005/0094499 A1 | 5/2005 | Verschuren |
| 2005/0270937 A1* | 12/2005 | Lee et al. ............... 369/47.19 |
| 2006/0212780 A1 | 9/2006 | Ohira et al. |
| 2006/0233286 A1 | 10/2006 | Annampedu et al. |
| 2007/0094578 A1 | 4/2007 | Kikuchi et al. |
| 2007/0165208 A1 | 7/2007 | Cowburn et al. |
| 2008/0144463 A1 | 6/2008 | Ueki |
| 2008/0259759 A1 | 10/2008 | Martens et al. |
| 2009/0046820 A1 | 2/2009 | Clark et al. |
| 2009/0290671 A1 | 11/2009 | Rea et al. |

OTHER PUBLICATIONS

ECMA-330 $3^{rd}$ Edition / Jun. 2005; 120 mm (4,7 Gbytes per side) and 80 mm (1,46 Gbytes per side) DVD Rewritable Disk (DVD-RAM).

* cited by examiner

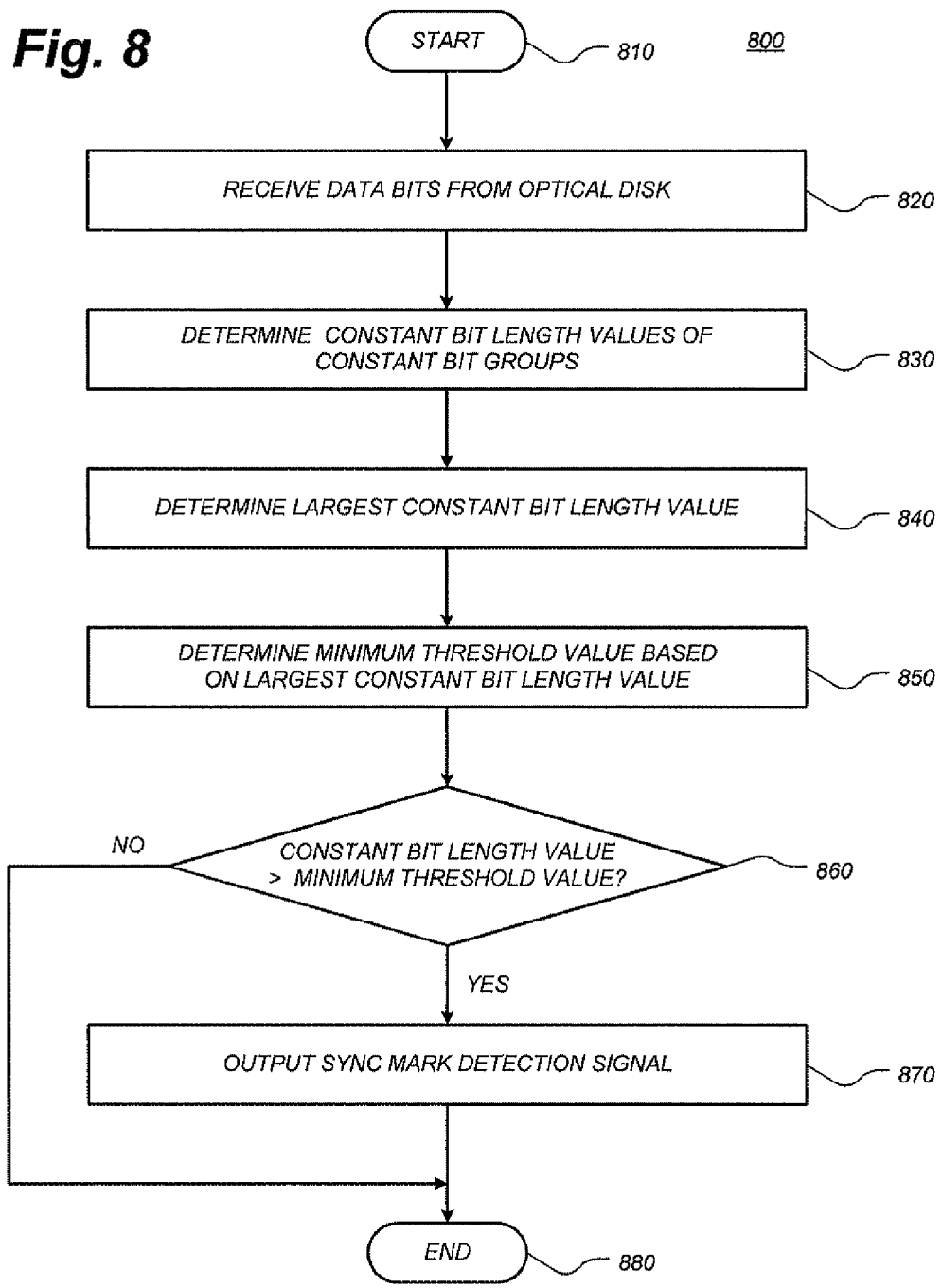

TIMING LOOP WITH LARGE PULL-IN RANGE

CROSS-REFERENCE TO RELATED APPLICATIONS

This application is a continuation of U.S. patent application Ser. No. 12/625,844, filed Nov. 25, 2009. The U.S. patent application Ser. No. 12/625,844 claims the benefit of U.S. Provisional Application No. 61/138,815 filed Dec. 18, 2008, and is a Continuation-In-Part of a U.S. Non-provisional application Ser. No. 12/359,855, filed Jan. 26, 2009, which claims priority and the benefit thereof from a U.S. Provisional Application No. 61/025,119, filed Jan. 31, 2008, all of which are herein incorporated by reference for all purposes as if fully set forth herein. Furthermore, the Nonprovisional application Ser. No. 12/359,855 is a Continuation-In-Part of a co-pending U.S. Nonprovisional application Ser. No. 11/775,119, filed on Jul. 9, 2007, which claims priority and the benefit thereof from a U.S. Provisional Application No. 60/830,630, filed on Jul. 13, 2006, all of which are herein incorporated by reference for all purposes as if fully set forth herein.

BACKGROUND OF THE DISCLOSURE

1. Field of the Disclosure

The disclosure is directed generally to aiding frequency acquisition and, more particularly, to a method and device to extend the pull-in range of a timing recovery circuit for a storage device, such as an optical disc drive.

2. Related Art

Storage devices, such as disc drives and optical storage drives, use a spindle motor to rotate the storage disc. To ensure that information from the storage disc is obtained, it is necessary to know the rotational speed to correlate the data frequency of the storage disc.

One known method for obtaining the frequency includes moving a laser reading head to a hub of the storage disc and moving it back to a certain radius. Based on known radius and rotational speed, the data frequency can be estimated. However, this results in only an estimate of the frequency, and the error rate may be as high as 10% or even higher in some cases.

To account for this error, timing loop correction circuits have been employed to attempt to correct the error and pull-in the detected frequency so that the error is sufficiently small. However, known timing loop correction circuits may suffer from the problem with not being able to pull-in errors of relatively larger corrections. By way of example, a timing loop correction circuit may only be able to pull-in a frequency error of about 0.5%. If the frequency error is greater, the storage device may be unable to lock in the frequency and access the data. Accordingly, it would be desirable to provide improved frequency error pull-in for storage devices and, in particular, for optical storage drives.

SUMMARY OF THE DISCLOSURE

According to one aspect of the disclosure, a sync mark detector for detecting a sync mark having alternative polarities includes (a) an input terminal configured to receive data bits, wherein the data bits include constant bit groups and each constant bit group includes consecutive bits of the same logic value, (b) the first unit configured to output constant bit length values that are representative of bit lengths of constant bit groups, respectively, (c) the second unit configured to output combined bit length values, wherein each combined bit length value is representative of a sum of two consecutive constant bit length values, (d) the third unit configured to compare each combined bit length value to a largest previous combined bit length value to determine a largest combined bit length value, (e) the fourth unit configured to determine a threshold value based on the largest combined bit length value, and (f) the fifth unit configured to output a sync mark detection signal when an individual combined bit length value is larger than the threshold value.

The first unit may include (a) a bit value change detector connected to the input terminal and configured to output a bit value change signal when a logic value of the (M)th bit of the plurality of data bits is different from that of the (M−1)th bit of the plurality of data bits, wherein M is a series of positive value integer numbers starting from two, and (b) a counter connected to the bit value change detector. The counter may be configured to start a count when the (M−1)th bit and the (M)th bit have the same logic value, increment the count per data bit when no logic value change occurs in subsequent data bits until a logic value change occurs in the subsequent data bits, and output the incremented count as the constant bit length value when the logic value change occurs in the subsequent data bits.

According to another aspect of the disclosure, a method for detecting a sync mark having alternative polarities includes (a) receiving data bits including constant bit groups, each constant bit group including a plurality of consecutive bits of the same logic value, (b) generating constant bit length values that are representative of bit lengths of the constant bit groups, respectively, (c) generating combined bit length values, each combined bit length value being representative of a sum of two consecutive constant bit length values, (d) comparing each combined bit length value to the largest previous combined bit length value to determine the largest combined bit length value, (e) determining a threshold value based on the largest combined bit length value, and (f) outputting a sync mark detection signal when an individual combined bit length value is larger than the threshold value.

The generating the plurality of constant bit length values may include (a) comparing a logic value of the (M)th bit to that of the (M−1)th bit, wherein the (M−1)th and (M)th data bits are two consecutive bits of the data bits, and M is a series of positive value integer numbers starting from two, (b) starting a count when the (M−1)th bit and the (M)th bit have the same logic value, (c) incrementing the count per data bit when no logic value change occurs in subsequent data bits until a logic value change occurs in the subsequent data bits, and (d) outputting the incremented count as a constant bit length value when the logic value change occurs.

The generating the combined bit length values may include outputting a sum of the (N)th constant bit length value to the (N+1)th constant bit length value as the combined bit length value, wherein N is a series of positive value integer numbers starting from one. The comparing each combined bit length value to the largest previous combined bit length value may include (a) comparing the (M)th combined bit length value and the (M−1)th largest previous combined bit length value, wherein M is a series of positive value integer numbers starting from two, (b) outputting a larger one of the (M)th combined bit length value and the (M−1)th largest previous combined bit length value as the (M−1)th largest combined bit length value, and (c) using the (M−1)th largest combined bit length value as the (M)th largest previous combined bit length value.

In yet another aspect of the disclosure, a method is provided for offsetting a frequency error. The method includes (a) determining a distance between the (M−1)th sync mark detection signal and the (M)th sync mark detection signal, wherein M is a series of positive value integer numbers starting from two, (b) calculating a difference between the distance and a reference distance value, (c) discarding the (M)th sync mark detection signal when the difference is not within a range, and (d) generating a frequency offset signal based on the (M)th sync mark when the difference is within the range.

Additional features, advantages, and embodiments of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings:

FIG. 8 shows a process for detecting a sync mark in data bits according to the principles of the disclosure.

DETAILED DESCRIPTION OF THE DISCLOSURE

Figure 1:
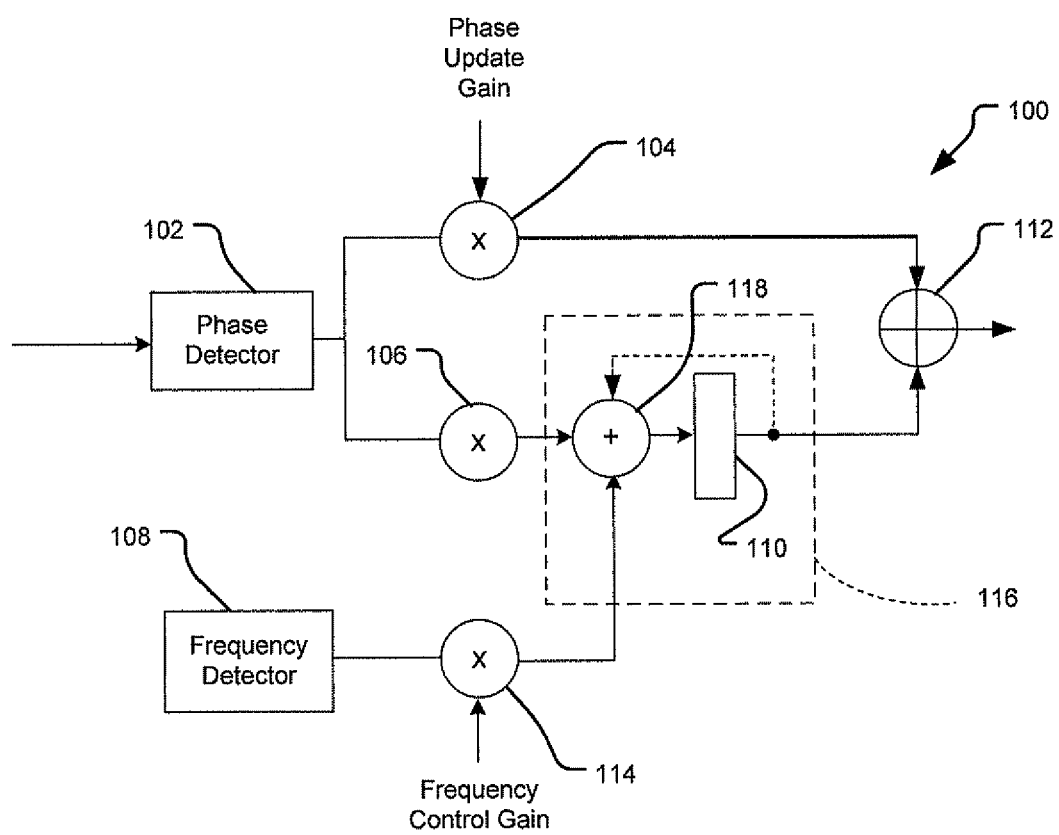
FIG. 1 shows a timing loop circuit constructed according to the principles of the disclosure.

The embodiments of the disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure, which is defined solely by the appended claims and applicable law. Moreover, it is noted that like reference numerals reference similar parts throughout the several views of the drawings.

According to principles of the disclosure, a frequency detector scheme is employed to aid in a "frequency acquisition circuit for storage devices such as optical storage, but a skilled artisan will appreciate that the principles of the disclosure may be employed in other storage devices having storage media rotating at high frequencies and similar devices. This implementation may significantly extend the pull-in range of the timing recovery loop. Storage discs have different storage formats that include various types of periodic repeating signals, such as the sync marks referred to above. Depending on the format of the storage disc and different operational modes, the frequency detector can use the known distance between sync marks associated with the storage disc formats to detect errors. The frequency offset can then be estimated using the known distance between the detected sync marks. The estimated frequency offset can be multiplied by a gain factor and added to a "frequency accumulator of the timing recovery loop to control the frequency of the channel lock and hence keep synchronized with the frequency of the RF signal. The principles of the disclosure are described in greater detail with respect to the exemplary embodiments described below.

FIG. 1 shows a configuration of a timing loop circuit 100 constructed according to the principles of the disclosure. The timing loop circuit 100 is a feedback circuit that may control the generation of the channel clock based upon the detected error in phase and frequency. The timing loop circuit 100 includes a phase detector 102, a frequency detector 108, a frequency accumulator 116 and a clock generator, e.g. a voltage controlled oscillator (VCO) (which is not shown here), as further described below.

The phase detector 102 detects the phase of the received signal and outputs a phase detector output signal, such as, a timing error signal that is branched over two lines. In the first branch, the phase detector output signal may be scaled with a phase update gain at a combiner 104, which may be a multiplier circuit that multiplies the signal by the phase update gain. In the second branch, the phase detector output signal may be scaled by a frequency update gain at multiplier 106, which also may be a multiplier circuit.

The frequency detector 108 aids in frequency acquisition in the timing loop circuit 100. The output of the frequency detector 108 may be scaled by a frequency control gain using a multiplier 114, such as a multiplier circuit, and combined with the output of multiplier 106 in the timing loop circuit 100 by adder 118, such as a summing circuit. The use of frequency detector 108 in the timing loop circuit 100 can extend the pull-in range of the timing loop. More specifically, the output from multiplier 114 is combined with the output of multiplier 106 in frequency accumulator 116. The frequency accumulator 116 includes the adder 118 and delay component 110.

The output of adder 118 is delayed by delay component 110. The output of the delay component 110 is fed back into adder 118. The output from the frequency accumulator 116 is combined with the output from combiner 104 at another combiner 112, such as a summing circuit. The output of combiner 112 is then sent to a VCO, or other means for clock generation, to generate the clock controlling the ADC.

Figure 2:
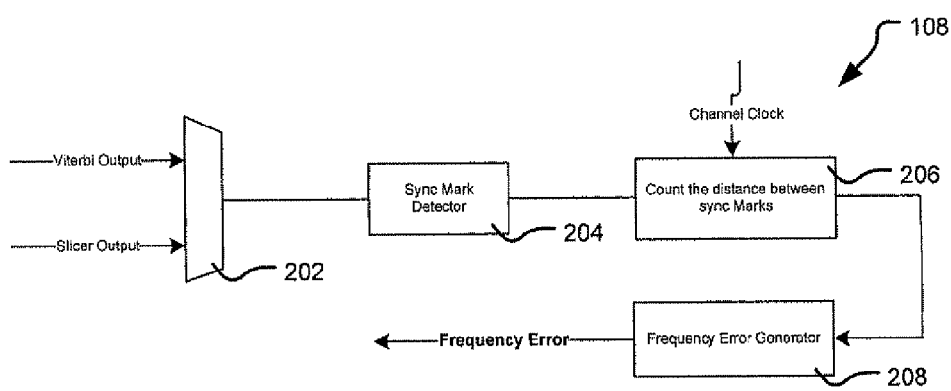
FIG. 2 shows a frequency detector, constructed according to the principles of the disclosure.

FIG. 2 shows a configuration of the frequency detector 108 shown in FIG. 1, constructed according to the principles of the disclosure. The frequency detector 108 may be a sync mark distance based frequency detector. The frequency detector 108 may include a multiplexer 202, a sync mark detector 204, a counter 206 and a frequency error generator 208. The sync marks on the storage media may be detected using one or more detectors, such as a Viterbi detector and/or a slicer detector and/or a decision feedback equalizer and/or a correlation detector, which are coupled to the read head of a storage drive, as is known in the art. The output from the Viterbi and/or slicer detectors is received at a multiplexer 202. A VIT_OR_SLICER controls which signal to use. For the slicer output, a limit equalizer (not shown) positioned before the slicer may be used to equalize the signal.

The sync mark detector 204 is responsive to the output of the multiplexer 202. The sync mark detector 204 may be a matched filter that detects a signal output from the multiplexer 202 and determines when a match for a specific sync mark occurs. According to an embodiment of the disclosure, the sync mark detector 204 may be programmable to permit the detection of different types of sync marks. Different storage formats, such as CD, DVD, Blu-ray or HD DVD, use different types of sync marks and different distances between the sync marks. Therefore, the sync mark detector 204 may be programmable to allow the frequency detector 108 to be used with different storage devices.

The counter 206 is responsive to the output from sync mark detector 204. The output from sync mark detector 204 indicates whether a sync mark occurrence has been detected. Using a channel clock signal, the counter 206 determines the distance between the detected sync marks. This distance may be expressed by the number of clock cycles between occurrences of the sync marks or the like, as a skilled artisan would appreciate. A frequency offset may be estimated from the distance between the detected sync marks by the frequency error generator 208. As described above, the estimated frequency offset can be multiplied with the frequency control gain by multiplier 114 and the result is then provided to the frequency accumulator 116.

Thus, the frequency error generator 208 receives the output from counter 206, and generates a frequency offset, which is input to multiplier 114.

Figure 2A:
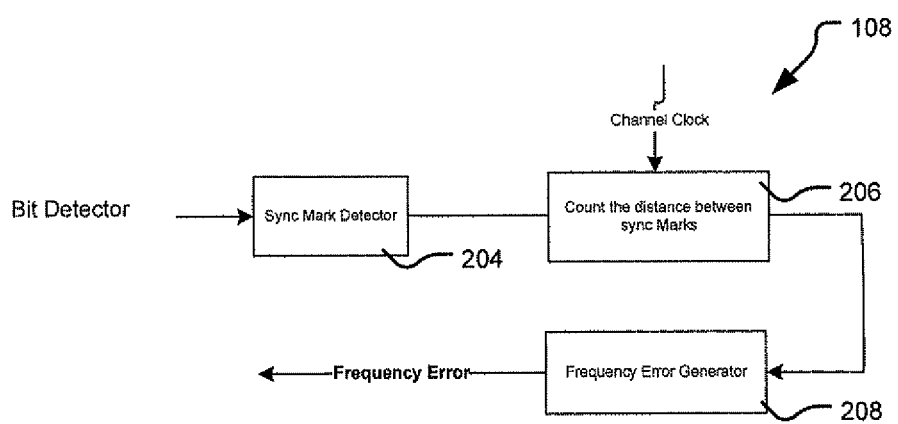
FIG. 2A shows another frequency detector constructed according to the principles of the disclosure.

FIG. 2A shows another configuration of the frequency detector 108 shown in FIG. 1, constructed according to the principles of the disclosure. More specifically, in the FIG. 2A aspect, the sync marks on the storage media may be detected using a bit detector, such as a Viterbi detector and/or a slicer detector and/or a decision feedback equalizer and/or a correlation detector, which are coupled to the read head of the storage drive, as is known in the art.

Figure 2B:
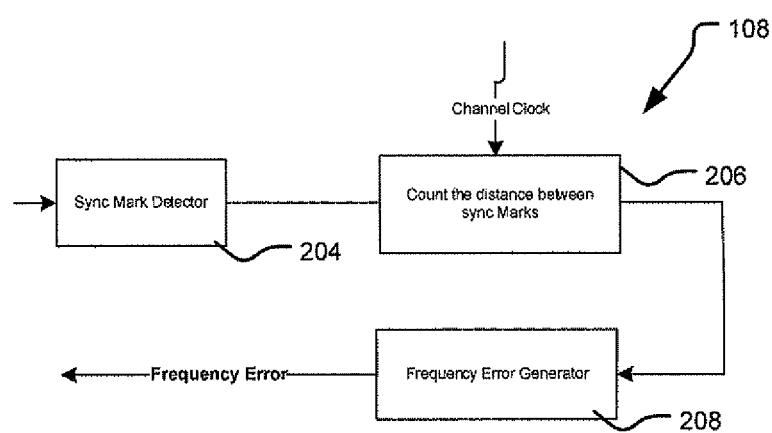
FIG. 2B shows yet another frequency detector constructed according to the principles of the disclosure.
Figure 3:
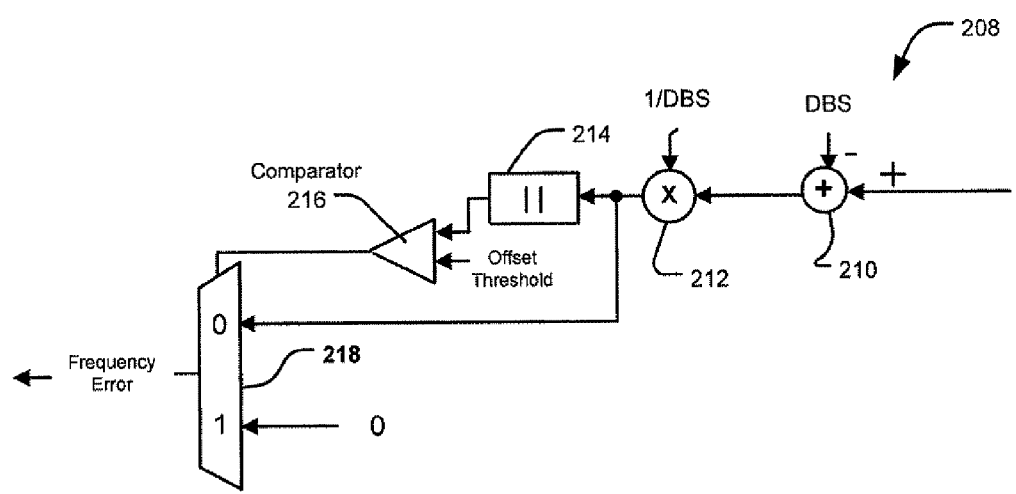
FIG. 3 shows a frequency error generator constructed according to the principles of the disclosure.

FIG. 2B shows yet another configuration of the frequency detector 108 shown in FIG. 1, constructed according to the principles of the disclosure. In this aspect, the sync marks on the storage media may be detected using a sync detector such as a correlation or matched filter detector. The frequency error generator 208 will now be described in greater detail below in connection with FIG. 3.

The frequency error generator 208 is responsive to the output of counter 206. The output of the frequency error generator 208 is a function of the detected distance between sync marks and the expected distance, in for example clock cycles, between the known occurrences of the sync marks. As described above, different storage formats may have different sync marks, and different distances between the occurrences of the sync marks. The expected distance between sync marks may be programmable, so that the system of the disclosure may be used with various types of storage formats. The detected and expected distances are combined in the frequency error generator 208. The expected distance between the sync marks may be received by a combiner 210, such as a summer circuit. Combiner 210 subtracts the expected distance (DBS) from the detected distance from counter 206 between the sync marks.

To normalize the difference between the expected distance and the detected distance, and account for the normal distances between the sync marks, the output of combiner 210 is input to combiner 212, such as a multiplier circuit. Combiner 212 multiples the output of combiner 210 by the inverse of the expected distance (1/DBS), or an estimate thereof between the sync marks.

The output of combiner 212 may be input into an absolute value module 214, which converts the signal into an absolute value signal. This absolute value signal may be compared with an offset threshold by a comparator 216. A comparison with the offset threshold may ensure that no clearly erroneous detection signals are used in frequency acquisition. By way of example, an offset threshold may be set so that detected offset amounts in the signal of greater than 50% are ignored. Other threshold values may also be used. The threshold offset may be changed, thereby allowing the system of the disclosure to be used with various storage formats.

The output of the comparator 216 controls the output of a multiplexer 218. The inputs to the multiplexer 218 are zero (0) and the output of combiner 212. When the absolute value of the output of the combiner 212 is greater than the offset threshold, the multiplexer 218 outputs zero for the frequency offset. When the absolute value of the output of combiner 212 is less than the offset threshold, the multiplexer 218 outputs the value of the output of combiner 212 as the frequency offset.

Figure 3A:
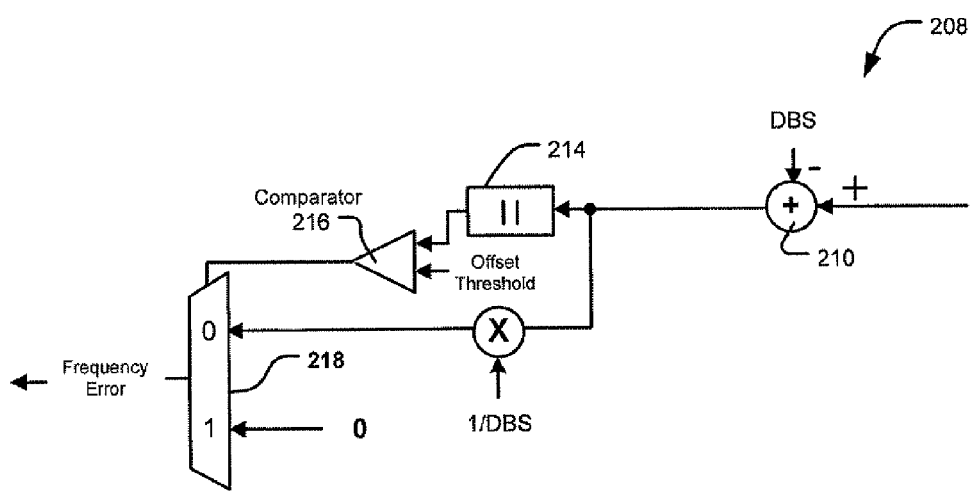
FIG. 3A shows another frequency error generator constructed according to the principles of the disclosure.

FIG. 3A shows a configuration of the frequency error generator 208 shown in FIGS. 2, 2A and 2B, constructed according to the principles of the disclosure. In this aspect, the output of combiner circuit 210 may also be input into an absolute value module 214, which converts the signal into an absolute value Signal. This absolute value signal may be compared with an offset threshold by a comparator 216. A comparison with an offset threshold may ensure that no clearly erroneous detection signals are used in frequency acquisition. By way of example, an offset threshold may be set so that detected offset amounts of greater than 50% are ignored. Other threshold values may also be used. The offset amount may be changed, thereby allowing the system of the disclosure to be used with various storage formats.

Figure 4:
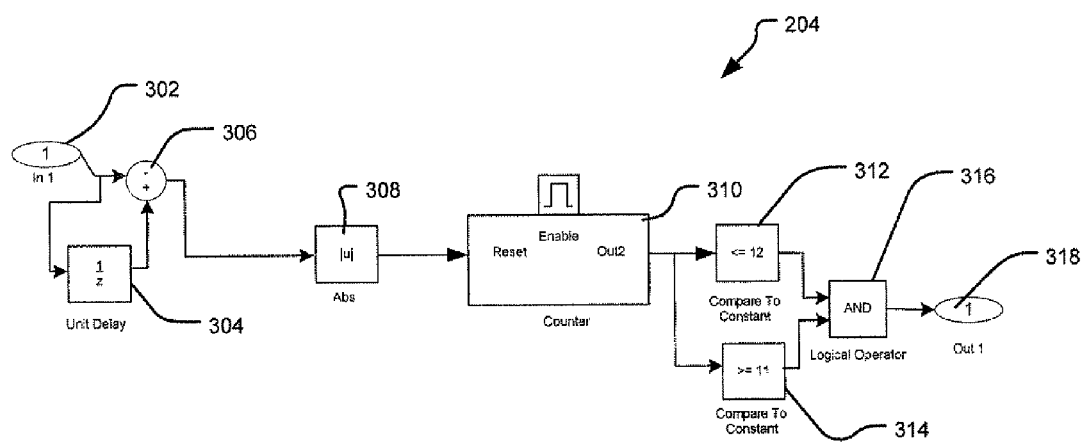
FIG. 4 shows a sync mark detector constructed according to the principles of the disclosure.

FIG. 4 shows a configuration of the sync mark detector 204 shown in FIGS. 2, 2A and 2B, constructed according to the principles of the disclosure. The input 302 to the sync mark detector 204 is responsive to bits detected at the multiplexer 202. The input signal may be sent through a delay 304, and subtracted from the (non-delayed) input signal at a combiner 306, such as an adding circuit. The output of combiner 306 may be sent to an absolute value module 308, which outputs the absolute value of the signal received from combiner 306.

A counter 310 receives the signal from the absolute value module 308. The counter 310 is enabled by the occurrence of a sync mark, and counts the number of clock cycles between each occurrence of the sync mark received in the sync mark detector 204.

The output of counter 310 may be input into comparators 312 and 314. Each of comparators 312 and 314 has a threshold amount based on the storage format. In the example illustrated in FIG. 4, comparator 312 is set at less than or equal to twelve (12), while comparator 314 is set at greater than or equal to eleven (11). Thus, the comparator 312 outputs a high signal when it receives a signal less than or equal to twelve (12), and comparator 312 outputs a low signal when it receives a signal greater than twelve (12). The comparator 314 outputs a high signal if it receives a signal greater than or equal to eleven (11), and comparator 314 outputs a low signal if it receives a signal less than eleven (11).

Comparators 312 and 314 are programmable to allow various storage formats to be used, By way of example, for high definition (HD) DVD storage the nominal comparison range is [11, 12], For DVD storage, the comparison range is [13, 15]. Other ranges may also be used.

The output of comparators 312 and 314 may be received at an AND gate The signal from the AND gate 316 is output to output 318.

Figure 5:
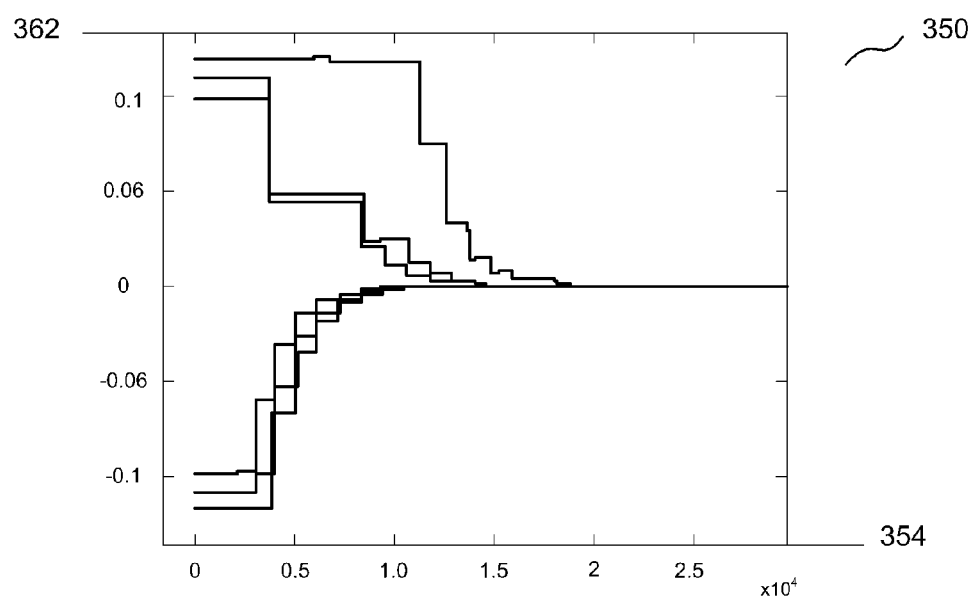
FIG. 5 shows a plot of simulated frequency trajectories resulting from principles of the disclosure.

FIG. 5 shows simulated frequency trajectories 350 resulting from use of a timing recovery circuit constructed according to the principles of the disclosure. The graph illustrates a frequency error percentage 362, on the vertical axis, compared to time 354, on the horizontal axis. The simulation was performed using a captured HD waveform with added noise. The noise level is added such that the Viterbi Bit Error Rate (BER) is in the order of 1e-3. As illustrated, the frequency error percentage decreases over time to zero, at which point there is no error in the detected frequency. FIG. 5 shows a pull-in range of at least 12%. Other pull-in ranges may also be obtained.

Figure 6:
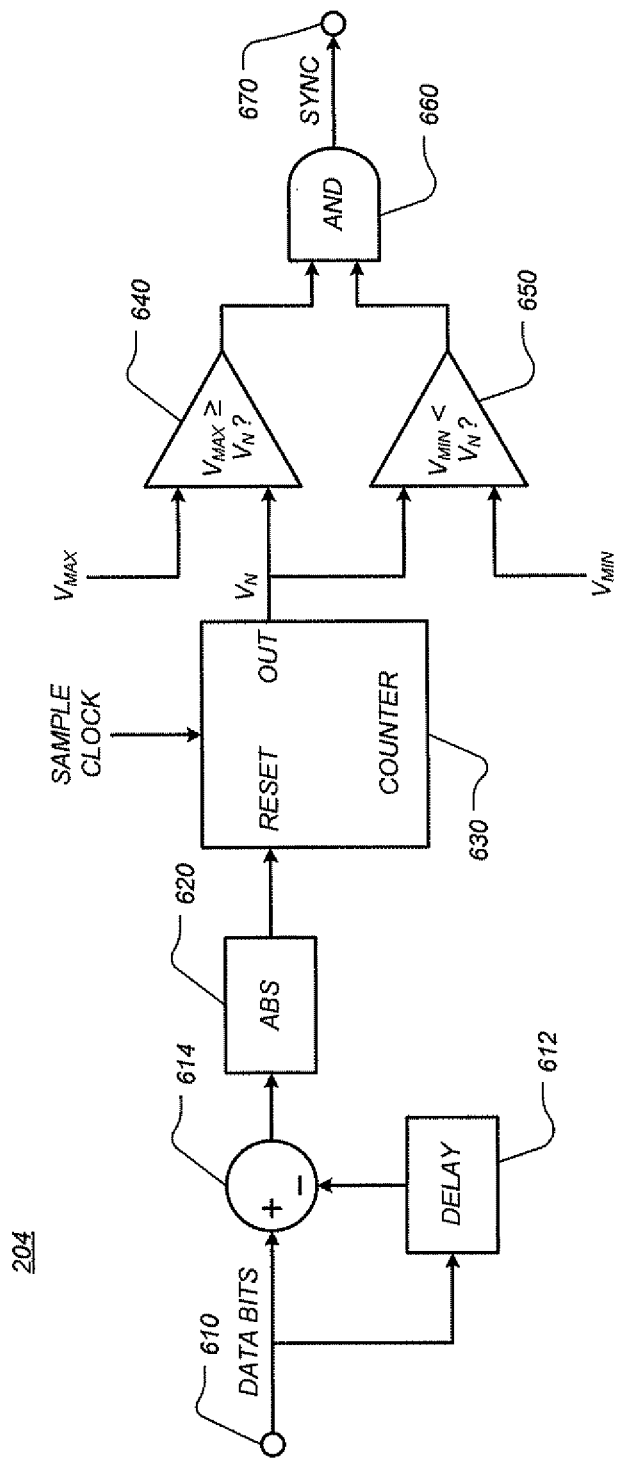
FIG. 6 shows a detailed configuration of the sync mark detector shown in FIG. 4, constructed according to the principles of the disclosure.

FIG. 6 shows a detailed configuration of the sync mark detector 204 shown in FIG. 4. The sync mark detector 204 may include an input terminal 610, a delay 612, a subtractor 614, an absolute value module (ABS) 620, a counter 630, a first comparator 640, a second comparator 650, an AND gate 660, an output terminal 670, and/or the like. The input terminal 610 may be configured to sequentially receive data bits, which may be readout data from an optical storage device, such as, a Compact Disk (CD), a Digital Versatile disk (DVD), a Blu-ray disc, a HD-DVD disc, or the like. The data bits may include a plurality of sync marks (i.e., sync marks) which may be periodically arranged in the data sectors of the optical storage device. The sync mark format may vary depending on the optical storage type. For example, in the DVD data format, the sync mark may be fourteen consecutive bits having the same logic value (e.g., "0" or "1"). Each sync mark may be followed by channel data containing data bits of audio data, video data, text data, control data and/or the like, which may be, for example, but is not limited to 1456 bits long in the DVD data format.

The data bits may include a plurality of constant bit groups, each constant bit group including a plurality of consecutive bits having the same logic value (e.g., "0" or "1"). The bit length of each constant bit group may be larger than two. Some of the constant bit groups may be the sync marks since the sync marks may also include a specific number of consecutive bits having the same logic value, for example, fourteen consecutive bits of "0" or "1" for the DVD data format.

The delay 612 may be, for example, a unit delay which may be configured to delay the data bits by a specific sample period. The delay 612 may be connected to the input terminal 610 to receive the data bits therefrom and may output the data bits to the subtractor 614 with, e.g., one sample cycle delay. The subtractor 614 may be connected to both the input terminal 610 and the delay 612 to receive the data bits from the input terminal 610 and the delayed data bits from the delay 612. Thus, the subtractor 614 may receive the (N)th bit of the data bits from the input terminal 610 and the (N−1)th bit from the delay 612 simultaneously (N may be a series of positive value integer numbers starting from two). For example, the subtractor 614 may receive the second bit of the data bits from the input terminal 610 and the first bit of the data bits from the delay 612 simultaneously.

The subtractor 614 may subtract the logic value of the (N−1)th bit from that of the (N)th bit and may sequentially output the differences therebetween, which may be one of "1," "0" and "−1." More specifically, when the (N−1)th and (N)th bits have the same logic value, for example, when both the (N−1)th and (N)th bits are either "0" or "1", the output from the subtractor 614 may be "0". When the (N−1)th and (N)th bits have different logic values, the subtractor 614 may output either "1" or "−1". The subtractor 614 may sequentially output the differences to the ABS 620, which may sequentially output absolute values of the differences. Consequently, the ABS 620 may output "0" when two consecutive bits have the same logic value and may output "1" when two consecutive bits have different logic values. For example, a constant bit group having a bit length of five may result in four consecutive bits of "0" output from the ABS 620. A fourteen bit long sync mark may result in thirteen consecutive bits of "0" output from the ABS 620. As mentioned above, the ABS 620 may output "1" only when there is a change (difference) in the logic values between two consecutive bits of the data bits. Thus, the sequential bits output from the ABS 620 may be referred to as a bit value change signal.

The counter 630 may be connected to the ABS 620 to receive the bit value change signal therefrom at a RESET input and a sample clock signal at a SAMPLE CLOCK input. The counter 630 may be configured to start a new count when the bit value change signal becomes "1." Then the counter 630 may increment the count per each sample cycle as long as the bit value change signal remains at "0." When the bit value change signal changes from "0" to "1" again, the counter 630 may be reset after outputting the counted number, and may start a new count. The counted number output from the counter 630, which is referred to as a constant bit length value, may be the same with the number of consecutive bits of "0" output from the ABS 620. Thus, when a constant bit group in the data bits is detected, the counter 630 may output a constant bit length value $V_N$ representing the length of the corresponding constant bit group.

In the particular configuration shown in FIG. 6, for example, a constant bit group having seven consecutive bits may result in a constant bit length value of six. Similarly, a fourteen bit long sync mark may result in a constant bit length value of thirteen. Thus, the constant bit length value may be smaller than the actual bit length of the corresponding constant bit group. However, the constant bit length value may be equal to or larger than the actual bit length of the corresponding constant bit group by modifying the configuration of the sync mark detector 204. For example, the sync mark detector 204 may include a sampler (not shown) that may sample each data bit twice per clock cycle such that, for example, a ten bit long constant bit group may be sampled as twenty bits.

The counter 630 may sequentially output the constant bit length values $V_N$ to the comparators 640 and 650 simultaneously. The comparator 640 may compare each constant bit length value $V_N$ to a maximum threshold value $V_M$ to determine whether the maximum threshold value $V_{MAX}$ is equal to larger than the constant bit length value. Simultaneously, the comparator 650 may compare the same constant bit length value $V_N$ to a minimum threshold value $V_{MIN}$ to determine whether the constant bit length value $V_N$ is larger than the minimum threshold value $V_{MIN}$.

The maximum threshold value $V_{MAX}$ and minimum threshold value $V_{MIN}$ may be determined based on the bit length of the sync mark. For example, in the configuration shown in FIG. 6, a fourteen bit long DVD sync mark was scaled to a constant bit length value $V_N$ of thirteen. In order to detect occurrences of the constant bit length value $V_N$ of thirteen, the maximum threshold value $V_{MAX}$ may be set to thirteen and the minimum threshold value $V_{MIN}$ may be set to twelve. The comparator 640 may be configured to output "1" only when an individual constant bit length value $V_N$ applied thereto is equal to or smaller than thirteen (i.e., maximum threshold value $V_{MAX}$). In other words, any constant bit length value $V_N$ that is higher than thirteen may cause the comparator 640 to output "0." Also, the comparator 650 may be configured to output "1" when the same constant bit length value $V_N$ is larger than twelve (i.e., minimum threshold value $V_{MIN}$). Any constant bit length value $V_N$ that is equal to or lower than twelve may cause the comparator 650 to output "0."

The outputs from the comparators 640, 650 may be applied to two inputs of the AND gate 660, which may output "1" to the output terminal 670 when the logic values of both inputs are "1." As mentioned above, the comparators 640, 650 may output "1" when an individual constant bit length value $V_N$ applied thereto is larger than the minimum threshold value $V_{MIN}$ and equal to or smaller than the maximum threshold value $V_{MAX}$. When any of the comparators 640, 650 outputs "0," the AND gate 660 may output "0" to the output terminal 670. Thus, the output from sync mark detector 204 becomes "1" when a constant bit group in the data bits applied to the input terminal 610 is exactly fourteen bit long, which is the bit length of the DVD sync mark, for example. Accordingly, the output Signal from the AND gate 660 may be used as a sync mark detection signal SYNC.

The maximum threshold value $V_{MAX}$ and the minimum threshold value $V_{MIN}$ may be adjusted to detect other types of sync mark having a different bit length. Further, the sync mark detector 204 may be configured such that a user may program the maximum threshold value $V_{MAX}$ and the minimum threshold value $V_{MIN}$. Alternatively, the sync mark detector 204 may be configured to automatically adjust the maximum threshold value $V_{MAX}$ and the minimum threshold value $V_{MIN}$ based on the sync mark format.

Figure 7A:
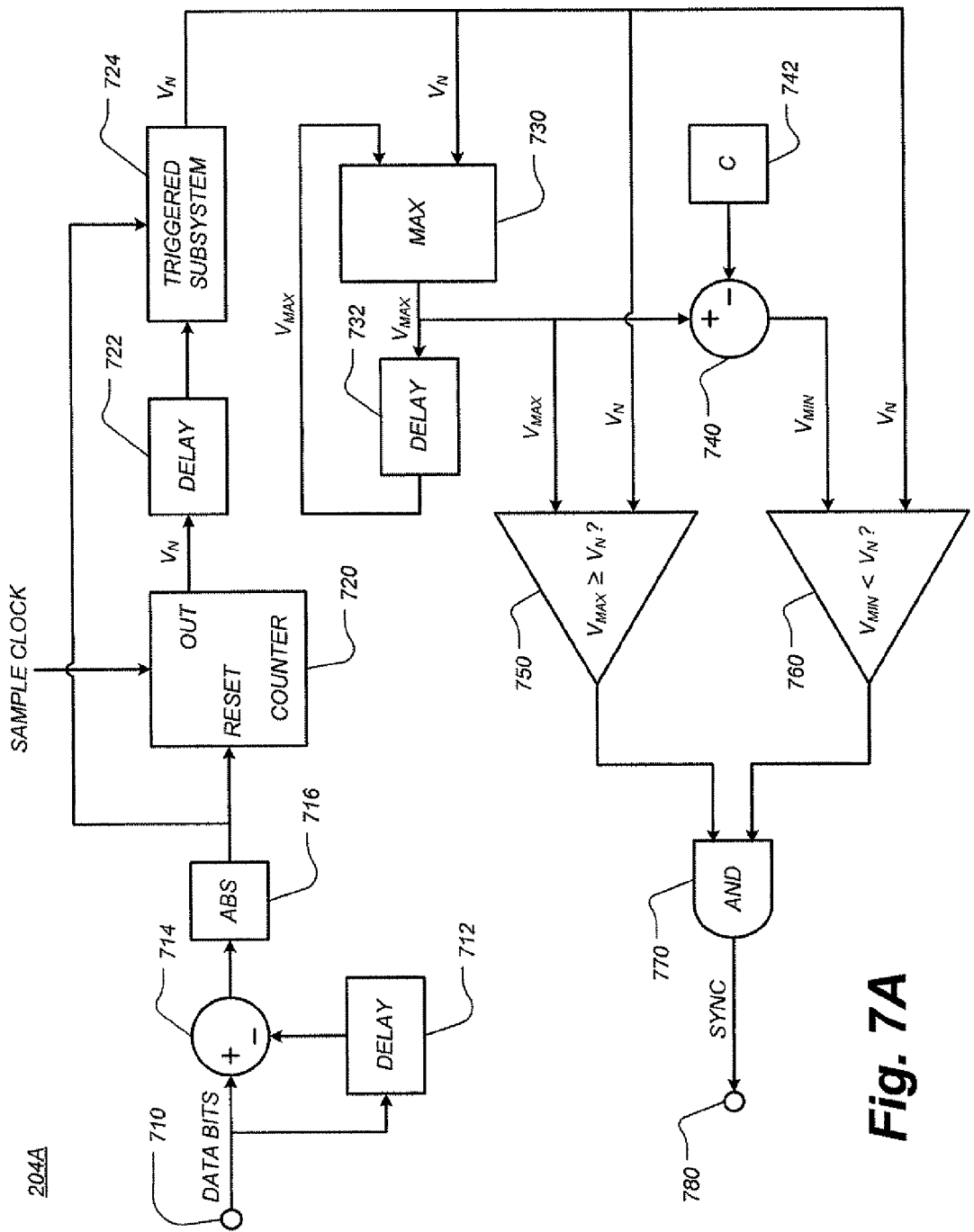
FIG. 7A shows another sync mark detector constructed according to the principles of the disclosure.

FIG. 7A shows another configuration 204A of the sync mark detector 204 shown in FIGS. 2, 2A and 2B, constructed according to the principle of the disclosure. The sync mark detector configuration 204A may include an input terminal 710, a delay 712, a subtractor 714, an absolute value module (ABS) 716, a counter 720, a delay 722, a triggered subsystem 724, a max comparator 730, a delay 732, a subtractor 740, a first comparator 750, a second comparator 760, an AND gate 770, an output terminal 780, and/or the like, The operations and interconnections of the input terminal 710, delay 712, subtractor 714, absolute value module (ABS) 716 and counter 720 may be similar to those of the input terminal 610, delay 612, subtractor 614, absolute value module (ABS) 620, and counter 630 of the sync mark detector 204 shown in FIG. 6. For example, the input terminal 710 may receive data bits which may include a plurality of constant bit groups, and the counter 720 may sequentially output constant bit length values $V_N$ representing the bit lengths of the corresponding constant bit groups, respectively.

The delay 722 may be connected to the counter 720 to receive the series of the constant bit length values $V_N$ therefrom. The triggered subsystem 724 may be connected to the delay 722 to receive the series of constant bit length values therefrom. Further, the triggered subsystem 724 may be connected to the ABS 716 to receive a bit value change signal therefrom. Thus, the triggered subsystem 724 may sequentially output a single constant bit length value $V_N$ at a time when the bit value change signal becomes "1," The max comparator 730 may have two inputs; of which one is connected to the triggered subsystem 724 to receive a single constant bit length value $V_N$ at a time therefrom; and the other one of which is connected to the output from the max comparator 730 via the delay 732. With this configuration, the max comparator 730 may output the larger one of two constant bit length values $V_N$ applied thereto and may feed the larger value back to one of its two inputs via the delay 732. Thus, when the (N)th constant bit length value $V_N$ is applied to one input of the comparator 732, the largest one of the previous constant bit length values $V_N$ (e.g., the first to (N-1) th constant bit length values) may be applied to the other input of the max comparator 730 (N is a series of positive value integer numbers, starting from two). Upon completing the comparison, the max comparator 730 may output the largest one of the first to (N)th constant bit length values $V_N$.

When the sync mark is the longest constant bit group in the data bits applied to the sync mark detector configuration 204A, it may not be necessary to program the maximum threshold value $V_{MAX}$ because the largest one of the constant bit length values $V_N$ determined by max comparator 730 may represent the bit length of the sync mark. Thus, the largest constant bit length value from the max comparator 730 may be used as the maximum threshold value $V_{MAX}$. The minimum threshold value $V_{MIN}$ may be determined based on the maximum threshold value $V_{MAX}$ and the bit length of the sync mark. For example, when the bit length of a sync mark is fourteen, the maximum threshold value $V_{MAX}$ may be the largest constant bit length value, which may be thirteen for the DVD sync mark in the particular configuration shown in FIG. 7A. This means that any constant bit length value that is equal to or smaller than twelve is not a sync mark. Thus, the minimum threshold value $V_{MIN}$ may be set to twelve, which may be obtained by using the subtractor 740 to subtract an appropriate constant C 742 from the maximum threshold value $V_{MAX}$. For example, the constant C 742 may be one ("1") in the case of the DVD sync mark.

The largest constant bit length value from the max comparator 730 may be applied as the maximum threshold value $V_{MAX}$ to the first comparator 750. Also, the output from the subtractor 740 may be applied as the minimum threshold value $V_{MIN}$ to the second comparator 760. When the triggered subsystem 724 outputs a constant bit length value $V_N$, the max comparator 730 may compare the constant bit length value $V_N$ to the largest previous constant bit length value and output the larger one thereof as the maximum constant bit length value $V_{MAX}$. When the constant bit length value $V_N$ is not larger than the largest previous constant bit length value, no change may be made to the maximum threshold value $V_{MAX}$ and the minimum threshold value $V_{MIN}$. Then, the constant bit length value $V_N$ may be applied to the first and second comparators 750, 760 simultaneously. The first comparator 750 may be configured to output "1" when the maximum threshold value $V_{MAX}$ is equal to or larger than the constant bit length value $V_N$. The second comparator 760 may be configured to output "1" when the constant bit length value $V_N$ is larger than the minimum threshold value $V_{MIN}$. For example, when the sync mark is fourteen bit long, both of the first and second comparators 750, 760 may output "1" when the constant bit length value $V_N$ is thirteen. When both of the first and second comparators 750, 760 output "1," the AND gate 770 may also output "1" to the output terminal 780 in order to indicate that a sync mark has been detected.

In the configuration 204A shown in FIG. 7A, it is possible that the first comparator 750 may continuously output "1" because the constant bit length value $V_N$ may not be larger than the maximum constant bit length value $V_{MAX}$. More specifically, a sync mark may be the very first constant bit group that is detected by the sync mark detector configuration 204A. The maximum threshold value $V_{MAX}$ and minimum threshold value $V_{MIN}$ may be automatically determined immediately after the sync mark is detected. Even when the constant bit length value $V_N$ represents a sync mark, the first comparator 750 may output "1" because the constant bit length value $V_N$ and the maximum constant bit length value $V_{MAX}$ may be the same. Thus, it is possible that the first comparator 750 may have no contribution to detecting sync marks in the data bits.

Figure 7B:
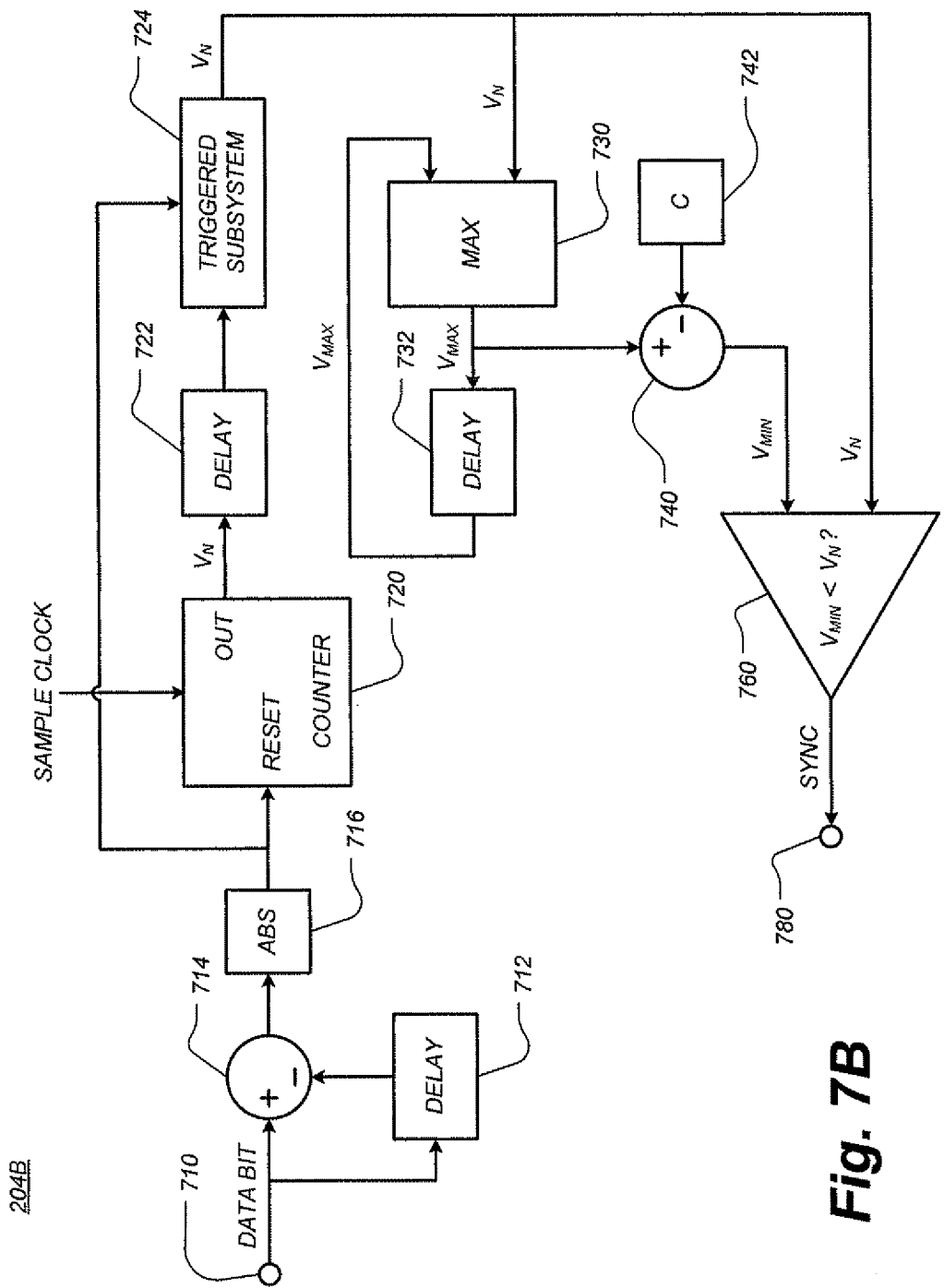
FIG. 7B shows yet another sync mark detector constructed according to the principles of the disclosure.

FIG. 7B shows another configuration 204B of the sync mark detector 204 shown in FIGS. 2, 2A and 2B, constructed according to the principles of the disclosure. The sync mark detector configuration 204B may be identical to the sync mark detector configuration 204A shown in FIG. 7A except for the first comparator 750 and the AND gate 770. As mentioned above, the first comparator 750 may not contribute to detecting sync marks because it may always configured and, hence, may be removed. When the first comparator 750 is removed, it is no longer necessary to compare the output signals from the first and second comparators 750, 760, and, hence, the AND gate 770 may also be removed. The comparator 760 may compare the constant bit length value $V_N$ to the minimum threshold value $V_{MIN}$ and may output "1" to the output terminal 780 when the constant bit length value $V_N$ is larger than the minimum threshold value $V_{MIN}$. Thus, the sync mark detector configuration 204B may be able to perform the same functions as the sync mark detector configuration 204A shown in FIG. 7A.

As described above, a constant bit length value may be scaled to be larger than the bit length of the corresponding constant bit group. For example, the sync mark detector configurations 204A, 204B may include a sampler (not shown) that may sample each data bit twice per clock cycle such that, for example, a fourteen bit long constant bit group may be sampled as twenty eight bits. Then, the constant bit length value $V_N$ thereof may be twenty seven and the minimum threshold value $V_{MIN}$ may be set to twenty six. With this configuration, the constant bit length value $V_N$ representing a constant bit group having a bit length of thirteen or smaller may never be larger than twenty five. Thus, more precise detection may be performed.

While sync marks may be generally the longest constant bit group, there may be a constant bit group that is longer than the sync marks. This unusually long constant bit group, referred to as an outlier, may be caused by a media defect. When an outlier is received by the sync mark detector configuration 204B shown in FIG. 7B, the max comparator 730 may output a constant bit length value $V_N$ of the outlier as the maximum threshold value $V_{MAX}$, which may be larger than the constant bit length value $V_N$ of the sync marks. Thus, the outlier may cause failure to detect the sync marks in the sync mark detector configuration 204B.

Figure 7C:
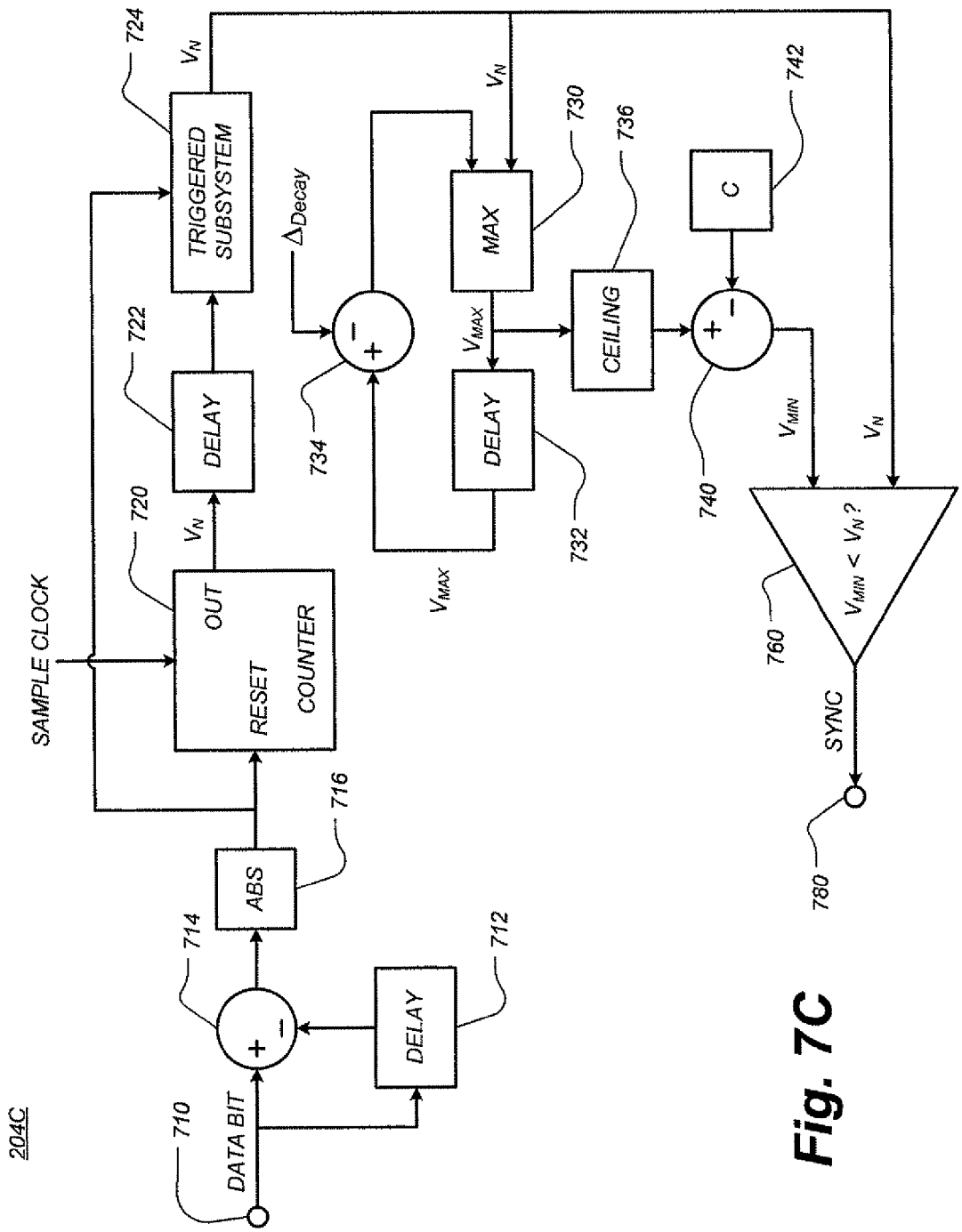
FIG. 7C shows yet another sync mark detector constructed according to the principles of the disclosure.

FIG. 7C shows another configuration 204C of the sync mark detector 204, constructed according to the principles of the disclosure, which may reduce the effect of an outlier. The sync mark detector configuration 204C may include a subtractor 734 and a ceiling unit 736 in addition to the components included in the sync mark detector configuration 20413 shown in FIG. 7B. The subtractor 734 may be coupled between the delay 732 and the max comparator 730. The subtractor 734 may be configured to subtract a decay value $\Delta_{Decay}$ from the maximum threshold value $V_{MAX}$ from the delay 732 until a new constant bit length value $V_N$ that is the same as, or larger than the current maximum threshold value $V_{MAX}$ is applied to the max comparator 730. By slowly decaying the maximum threshold value $V_{MAX}$, the constant bit length value $V_N$ of an outlier may be gradually decreased and the effect of an outlier may be reduced.

When a high sampling frequency is used in the sync mark detector configuration 204B, a maximum threshold value $V_{MAX}$ may become large. Particularly, when the sampling frequency is much higher than optimal, a maximum threshold value $V_{MAX}$ may become excessively large and the sync mark detector configuration 204B may not be able to detect sync marks at all. This problem may also be solved by slowly decaying the maximum threshold value $V_{MAX}$ using, for example, the sync mark detector configuration 204C. The decay value $\Delta_{Decay}$ may be sufficiently small such that the maximum threshold value $V_{MAX}$ does not decay radically between two consecutive sync marks.

Additionally or alternatively to the decay function, the sync mark detector configuration 204C may be configured to include a limited slew rate. For example, when a constant bit length value $V_N$ applied to the max comparator 730 is larger than the current maximum threshold value $V_{MAX}$ from the delay 732, the sync mark detector configuration 204C may be configured to set the new maximum threshold value $V_{MAX}$ by adding a small attack value $\Delta_{Attack}$, e.g., a value of one or two, to the current maximum threshold value $V_{MAX}$. This may also reduce the effect of an outlier.

Figure 7D:
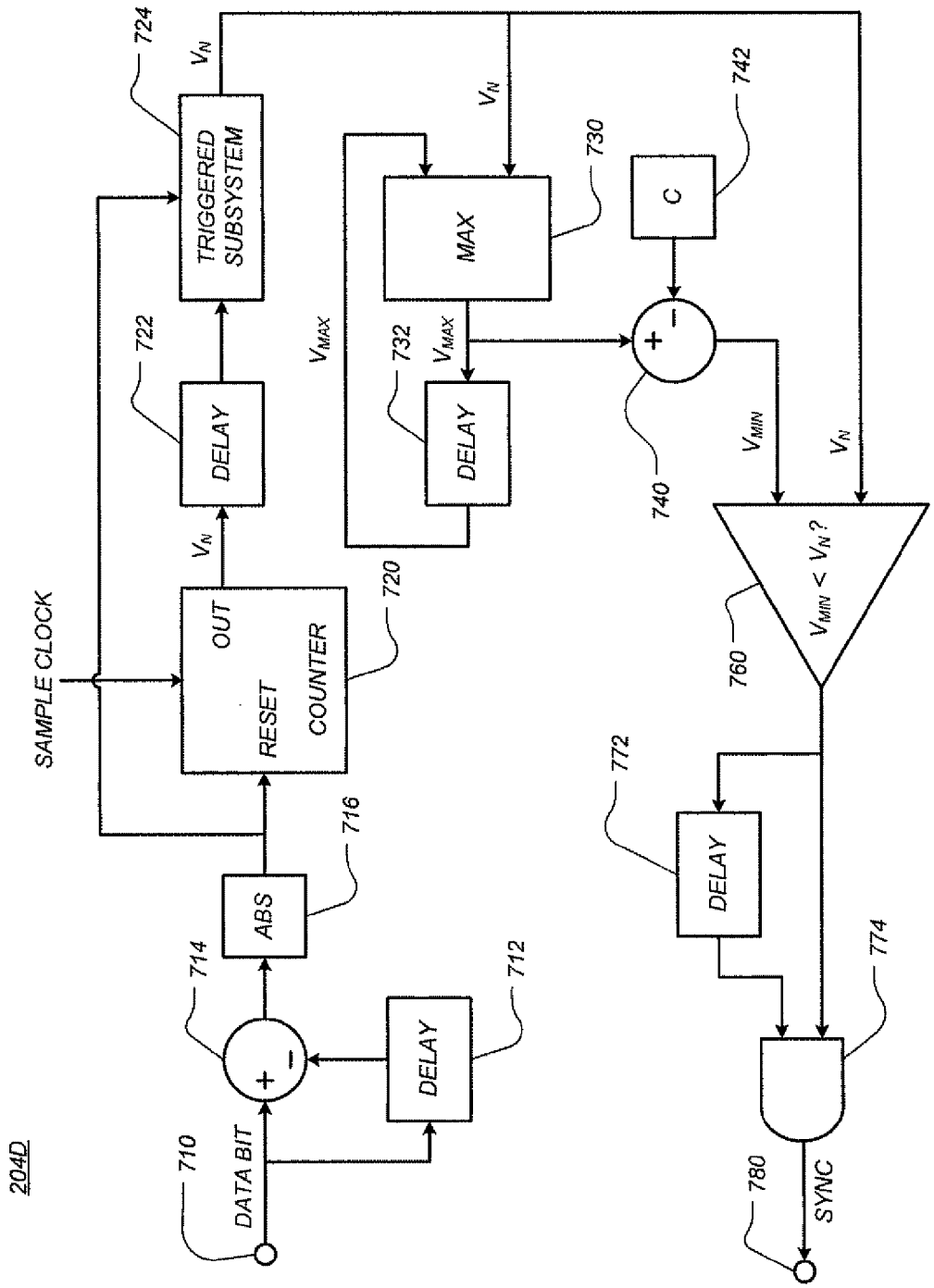
FIG. 7D shows yet another sync mark detector constructed according to the principles of the disclosure.

FIG. 7D shows another configuration 204D of the sync mark detector 204 shown in FIGS. 2, 2A and 213, constructed according to the principles of the disclosure. The sync mark detector configuration 204D may include a delay 772 and an AND gate 774 in addition to the components included in the sync mark detector configuration 204B shown in FIG. 7B. The delay 772 may be coupled between the output of the comparator 760 and an input of the AND gate 774. Another input of the AND gate 774 may be directly connected to the output of the comparator 760. With this configuration, the sync mark detector configuration 204D may be able to detect sync marks with alternating polarities. For example, in the CD format, the sync mark may include eleven consecutive bits of "1" followed by eleven consecutive bits of "0." The order may be reversed and the sync mark may include eleven consecutive bits of "0" followed by eleven consecutive bits of "1." In either case, the comparator 760 may output "1" when the first eleven consecutive bits of "1" (or "0") are processed. Subsequently, the comparator 760 may output another "1" when the second eleven consecutive bits of "0" (or "1") are processed. The first output "1" may be held by the delay 772 and provided to an input of the AND gate 774 when the second output "1" is provided to the other input of the AND gate 774. The AND gate 774 may output "1" to the output terminal 780 only when both inputs are "1." If any of the first and second eleven bits are not a constant bit group, the AND gate 774 may not output "1" to the output terminal 780. Thus, the output from the AND gate 774 may be used as a detection signal for sync marks with alternating polarities.

Figure 7E:
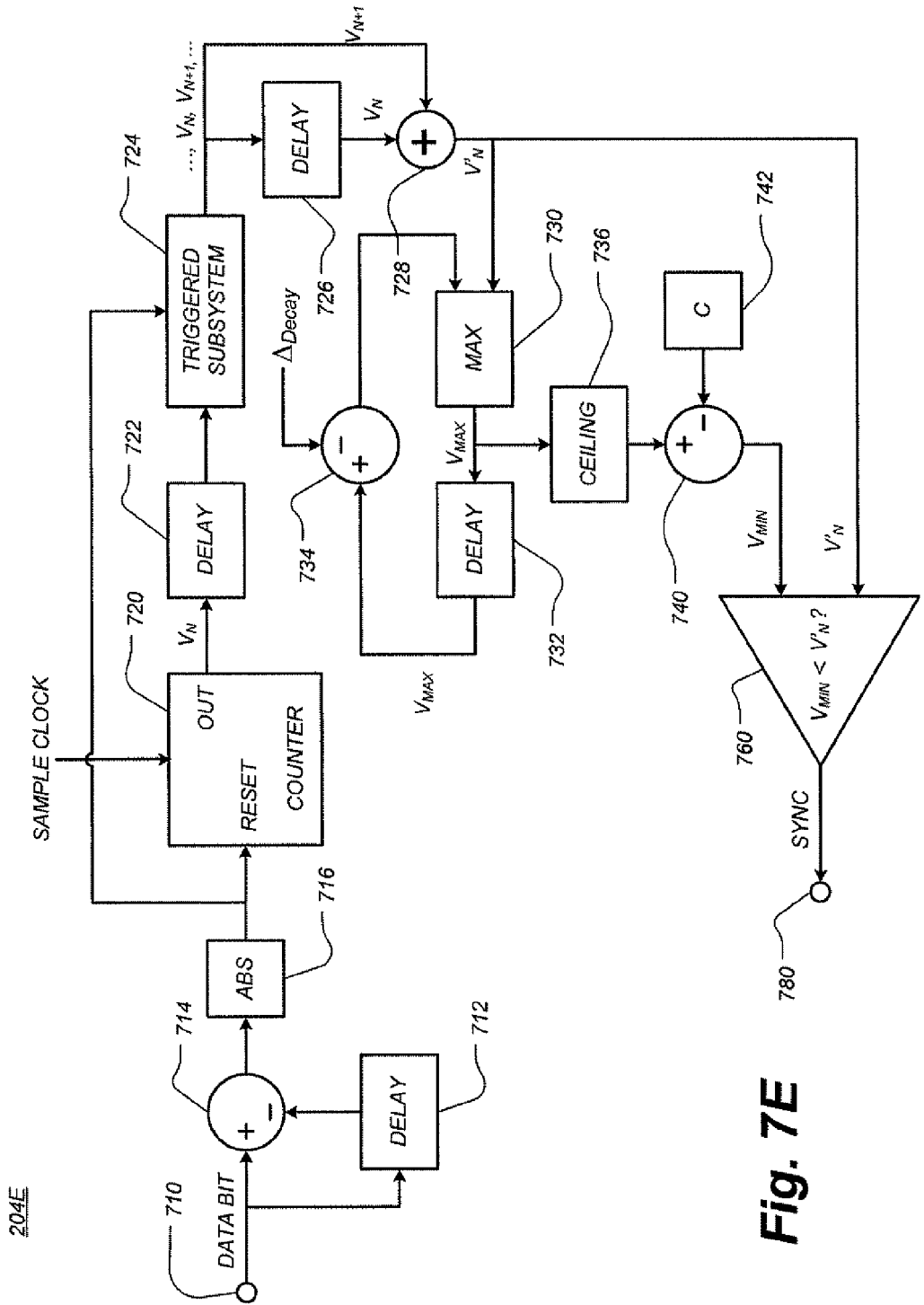
FIG. 7E shows yet another sync mark detector constructed according to the principles of the disclosure.

FIG. 7E shows another configuration 204E of the sync mark detector 204 shown in FIGS. 2, 2A and 2B, constructed according to the principles of the disclosure. The sync mark detector configuration 204E may be identical to the sync mark detector configuration 204C shown in FIG. 7C except for addition of a delay 726 and an adder 728. Other configurations with less or more components are also contemplated. For example, the sync mark detector configuration 204E may be constructed without the subtractor 734 and/or the ceiling unit 736 without departing from the scope of the disclosure.

The delay 726 may be coupled between the triggered subsystem 724 and the adder 728. The adder 728 may be connected to the triggered subsystem 724, the delay 726, the max comparator 730 and the comparator 760. The delay 726 may relay the (N)th constant bit length value $V_N$ from the triggered subsystem 724 to the adder 728 with a delay. For example, the delay 726 may output the (N)th constant bit length value $V_N$ when the triggered subsystem 724 outputs the (N+1)th constant bit length value $V_{N+1}$. In other words, two consecutive constant bit length values $V_N$, $V_{N+1}$ may be simultaneously provided to the adder 728 each time for executing an adding operation.

The adder 728 may combine the two consecutive constant bit length values $V_N$, $V_{N+1}$, and output a combined bit length value $V'_N$, which represents a sum of the constant bit length values $V_N$, $V_{N+1}$. For example, the first combined bit length value $V'_1$ may be a sum of the first constant bit length value $V_1$ and the second constant bit length value $V_2$. The adder 728 may output the combined bit length value $V'_N$ to the max comparator 730 and the comparator 760. Except for the delay 726 and the adder 728, the sync mark detector configuration 204E may be identical to the sync mark detector configuration 204C shown in FIG. 7C, as noted above. Other configurations are also contemplated in this disclosure.

The particular sync mark detector configuration 204E may be used to detect a sync mark having alternating polarities, i.e., a sync mark including a plurality of consecutive bits of "0" (or "1") followed by a plurality of consecutive bits of "1" (or "0"), for example, a total eighteen bit long sync mark including nine consecutive "0" bits followed by nine consecutive "1" bits. The delay 726 may output eight as the constant bit length value $V_N$ for the first nine consecutive "0" bits and the triggered subsystem 724 may also output eight as the constant bit length value $V_{N+1}$ for the subsequent nine consecutive "1" bits. Then, the adder 728 may perform add the constant bit length values $V_N$, $V_{N+1}$ and output sixteen as the combined bit length value $V'_N$. The resultant combined bit length value $V'_N$ may be provided to the max comparator 730 and the comparator 760 to determine and detect the sync mark having alternating polarities.

The detailed explanation of how a bit length value $V_N$ provided to the max comparator 730 and the comparator 760 are used to detect a sync mark has been described above with reference to FIGS. 7A, 713 and 7C. The operational principle may be the same when the combined bit length value $V'_N$ is provided to the max comparator 730 and the comparator 760. Thus, the combined bit length value $V'_N$ of the sync mark may be retained and processed by the max comparator 730, the delay 732 and the subtractor 740 to formulate and output the minimum threshold value $V_{MIN}$ to the comparator 760.

The comparator 760 may compare the minimum threshold value $V_{MIN}$ to each combined bit length value $V'_N$ received from the adder 728. The comparator 760 may output the sync signal SYNC to the output terminal 780 only when a combined bit length value $V'_N$ is larger than the minimum threshold value $V_{MIN}$. Any combined bit length values lower than the minimum threshold value $V_{MIN}$ may be considered as indications for non-sync mark data bits.

Optionally, the sync mark detector configuration 204E may include the subtractor 734 and the ceiling unit 736 to reduce the effect of an outlier. Furthermore, the sync mark detector configuration 204E may be modified to include a sampler (not shown) in order to sample each input data bit twice or more per clock cycle to increase the combined bit length value margin between the sync marks and non-sync marks. This may increase accuracy of the sync mark detection.

FIG. 8 shows a process 800 for detecting a sync mark in data bits, according to an embodiment of the disclosure. Upon starting the process 800 at 810, the data bits read from an optical disk may be received at 820. The data bits may include a plurality of constant bit groups, each constant bit group including a plurality of consecutive bits having the same logic value (e.g., "0" or "1"). Then, at 830 constant bit length values representing bit lengths of the constant bit groups, respectively, may be determined, and at 840 the largest constant bit length value may be determined. Based on the largest constant bit length value, at 850 a minimum threshold value may be determined. Subsequently, at 860 each constant bit length value may be sequentially compared to the minimum threshold value. When at 860 an individual constant bit length value is larger than the minimum threshold value, at 870 a sync mark detection signal may be output. When at 860 the individual constant bit length value is smaller than or equal to the minimum threshold value, at 880 the process 800 may end. Thus, according to the disclosure, a sync mark may be automatically detected without having to provide a bit length range for detection.

Figure 9:
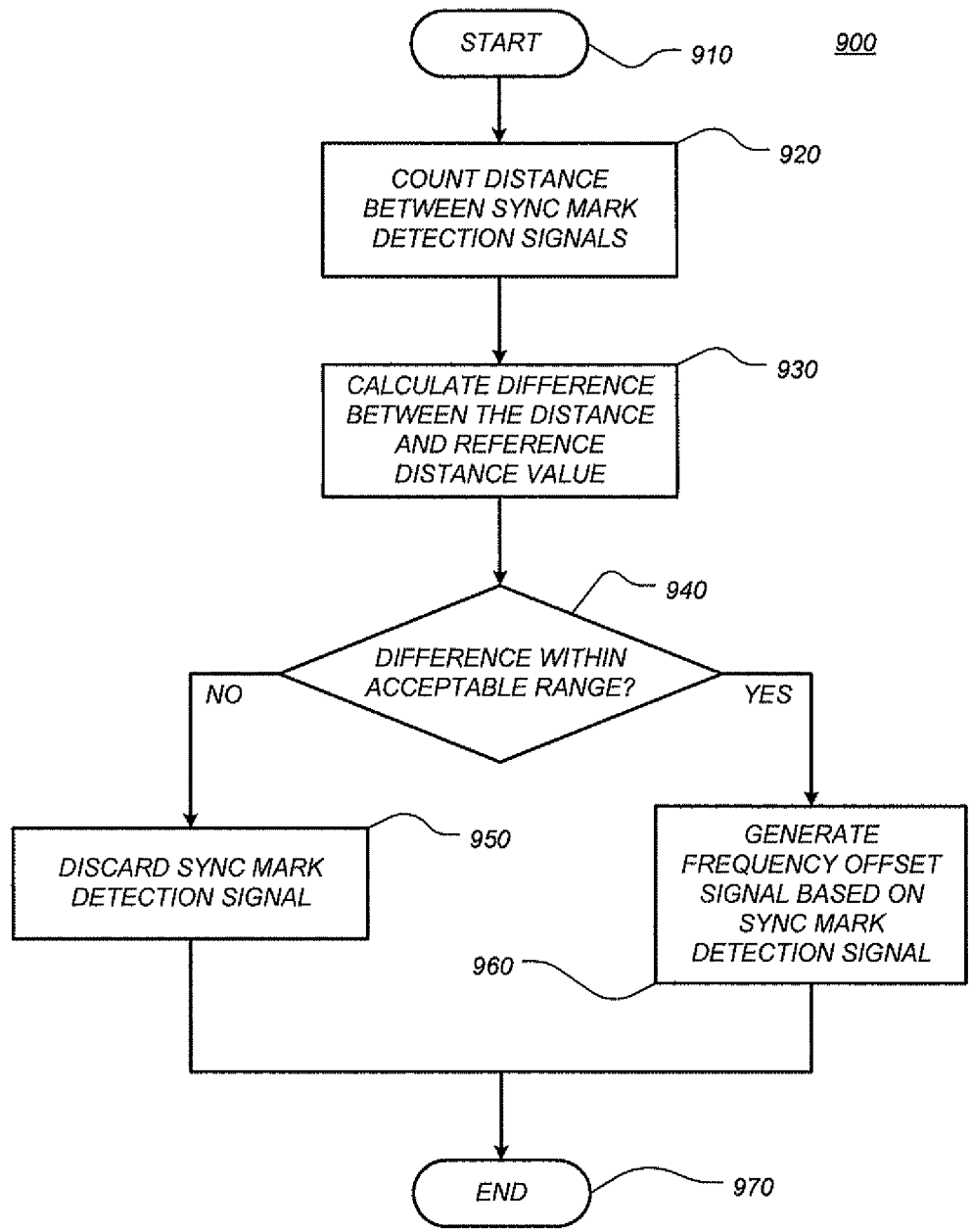
FIG. 9 shows a process for generating a frequency offset signal according to the principles of the disclosure.

FIG. 9 shows a process 900 for generating a frequency offset signal according to the principles of the disclosure. The process 900 may be performed by, for example, the counter 206 and the frequency error generator 208 shown in FIGS. 2, 2A and 2B and/or the like, to avoid offsetting the sample frequency based on a false sync mark. A false sync mark detection may be caused by a non-sync mark constant bit group, e.g., an outlier, of which the constant bit length value is greater than the minimum threshold value $V_{MIN}$ in the sync mark detector 204 shown in, for example, FIGS. 7B, 7C, 7D and 7E.

Upon starting the process 900 at 910, at 920 a distance between two consecutive sync mark detection signals may be counted by, for example the counter 206 in FIGS. 2, 2A and 2B. For example, the counter 206 may output a distance between the (M−1)th sync mark detection signal and an (M)th sync mark detection signal, wherein M is a series of positive value integer numbers starting from two. Then, at 930 a difference between the distance and a reference distance value may be calculated by, for example, the frequency error generator 208. The details of calculating the difference is describe above with reference to FIGS. 3 and 3A. The reference distance value and acceptable range may be predetermined and/or programmable. If at 940 the difference is within an acceptable range, the (M)th sync mark detection signal may be considered as a legitimate sync mark detection signal. At 960, a frequency offset signal may be generated based on the (M)th sync mark detection signal, at 970 the process 900 may terminate.

However, when the (M)th sync mark detection signal is caused by a non-sync mark located between two sync marks, the difference may not be within the acceptable range. For example, it is assumed that the reference distance value for a compact disk (CD) is 588 bits and the acceptable range is within 10% of the reference distance value. When a difference between the (M−1)th and (M)th sync mark detection signals is 288 bits, which is nearly 50% of the reference distance value and clearly outside the acceptable range, at 950 the (M)th sync mark detection signal may be discarded. This may prevent from incorrectly generating a frequency offset signal based on a non-sync mark. Upon discarding the false sync mark detection signal, at 970 the process 900 may terminate.

In accordance with various embodiments of the disclosure, the methods described herein are intended for operation with dedicated hardware implementations including, but not limited to, semiconductors, application specific integrated circuits, programmable logic arrays, and other hardware devices constructed to implement the methods and modules described herein. Moreover, various embodiments of the disclosure described herein are intended for operation with as software programs running on a computer processor. Furthermore, alternative software implementations including, but not limited to, distributed processing or component/object distributed processing, parallel processing, virtual machine processing, any future enhancements, or any future protocol can also be used to implement the methods described herein.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

While the disclosure has been described in terms of exemplary embodiments, those skilled in the art will recognize that the disclosure can be practiced with modifications in the spirit and scope of the appended claims. These examples given above are merely illustrative and are not meant to be an exhaustive list of all possible designs, embodiments, applications or modifications of the disclosure.

What is claimed is:

1. A sync mark detector, comprising:
   a first unit configured to decay over time a value indicating a length of a bit format by subtracting a predetermined value from the value in each delay period;
   a second unit configured to compare the decayed value with a detected length of the bit format to determine a new length, wherein the new length is a sum of the decayed value and another value that is smaller than a threshold; and
   a third unit configured to detect a sync mark based on the detected length and the new length.

2. The sync mark detector of claim 1, wherein the first unit is configured to decay the value indicating the length of consecutive bits of a same logic value.

3. The sync mark detector of claim 1, wherein the second unit is configured to determine the new length as a larger one of the decayed value and the detected length.

4. The sync mark detector of claim 1, wherein the value is a first value, and the third unit is configured to compare the detected length with a second value determined based on the new length.

5. The sync mark detector of claim 4, wherein the third unit is configured to subtract a predetermined value from the new length to determine the second value.

6. A method, comprising:
   decaying over time a value indicating a length of a bit format by subtracting a predetermined value from the value in each delay period;
   determining a new length by comparing the decayed value with a detected length of the bit format, wherein the new length is a sum of the decayed value and another value that is smaller than a threshold; and
   detecting a sync mark based on the detected length and the new length.

7. The method of claim 6, wherein decaying over time the value indicating the length of the bit format further comprises:
   decaying over time the value indicting the length of consecutive bits of a same logic value.

8. The method of claim 6, wherein determining the new length by comparing the decayed value with the detected length of the bit format further comprises:
   determining the new length as a larger one of the decayed value and the detected length.

9. The method of claim 6, wherein the value is a first value, and detecting the sync mark based on the detected length and the new length further comprises:
   comparing the detected length with a second value determined based on the new length.

10. The method of claim 9, further comprising:
    subtracting a predetermined value from the new length to determine the second value.

11. A timing recovery circuit, comprising:
    a frequency detector configured to detect a frequency offset based on sync mark detection, the frequency detector further comprising:
        a first unit configured to decay over time a value indicating a length of a bit format by subtracting a predetermined value from the value in each delay period,
        a second unit configured to compare the decayed value with a detected length of the bit format to determine a new length, wherein the new length is a sum of the decayed value and another value that is smaller than a threshold;
        a third unit configured to detect a sync mark based on the detected length and the new length; and
    a timing control circuit configured to generate a clock signal responsive to the frequency offset.

12. The timing recovery circuit of claim 11, wherein the first unit is configured to decay the value indicating the length of consecutive bits of a same logic value.

13. The timing recovery circuit of claim 11, wherein the second unit is configured to determine the new length as a larger one of the decayed value and the detected length.

14. The timing recovery circuit of claim 11, the value is a first value, and the third unit is configured to compare the detected length with a second value determined based on the new length.

15. The timing recovery circuit of claim 14, wherein the third unit is configured to subtract a predetermined value from the new length to determine the second value.

* * * * *